United States Patent
Salter et al.

(10) Patent No.: US 12,472,890 B2
(45) Date of Patent: Nov. 18, 2025

(54) VEHICULAR ELECTRICAL SYSTEM SHARING PRIMARY POWER WITH UPFIT EQUIPMENT

(71) Applicant: FORD GLOBAL TECHNOLOGIES, LLC, Dearborn, MI (US)

(72) Inventors: Stuart C. Salter, White Lake, MI (US); David Celinske, Wolverine Lake, MI (US); Zeljko Deljevic, Plymouth, MI (US); Todd Ansbacher, Westland, MI (US); John Anthony DeMarco, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 371 days.

(21) Appl. No.: 18/119,354

(22) Filed: Mar. 9, 2023

(65) Prior Publication Data

US 2024/0300426 A1    Sep. 12, 2024

(51) Int. Cl.
*B60R 16/023* (2006.01)
*B60R 16/033* (2006.01)
*H01H 85/02* (2006.01)
*H02H 3/20* (2006.01)

(52) U.S. Cl.
CPC ........ *B60R 16/0238* (2013.01); *B60R 16/033* (2013.01); *H01H 85/0241* (2013.01); *H02H 3/202* (2013.01); *H02H 3/207* (2013.01)

(58) Field of Classification Search
CPC .............. B60R 16/0238; B60R 16/033; H01H 85/0241; H02H 3/202; H02H 3/207
See application file for complete search history.

(56) References Cited

U.S. PATENT DOCUMENTS

| | | |
|---|---|---|
| 10,391,957 B2 | 8/2019 | Emrani |
| 11,458,856 B2 | 10/2022 | Paryani et al. |
| 2019/0354362 A1* | 11/2019 | Saito ................. B60Q 9/00 |
| 2020/0298888 A1* | 9/2020 | Ozeki ............. H01M 10/443 |
| 2022/0229104 A1 | 7/2022 | Jo |
| 2022/0332196 A1 | 10/2022 | Christen et al. |
| 2022/0337070 A1 | 10/2022 | Griffiths et al. |

(Continued)

FOREIGN PATENT DOCUMENTS

CN    112277727 A    1/2021

*Primary Examiner* — Zoheb S Imtiaz
(74) *Attorney, Agent, or Firm* — Frank Lollo; Brooks Kushman P.C.

(57) ABSTRACT

A motor vehicle electrical distribution system includes an upfitter power supply subsystem with overcurrent protection for tripping (opening) a solid-state relay when current drawn from a main electrical source by the upfitter subsystem impacts other priority electrical loads of the vehicle. Warnings/alerts are generated to inform the user (e.g., driver) of the tripping events, which may include real-time graphing of a recent history of events. In order to restore power to the upfitter subsystem, a voltage supplied by a supplemental battery (i.e., vehicle start-up battery) to the upfitter subsystem is monitored. If the voltage stabilizes then a voltage from the main electrical source is intentionally dropped to the stabilized value and the solid-state relay is re-closed. Then the main voltage is ramped back up to its nominal value. An automatic reset time may be added to delay the reclosing if the solid-state relay has been operated excessively.

20 Claims, 4 Drawing Sheets

(56) References Cited

U.S. PATENT DOCUMENTS

| | | | | |
|---|---|---|---|---|
| 2023/0104930 A1* | 4/2023 | Froeschl | ............... | H02J 50/005 |
| | | | | 320/108 |
| 2025/0026286 A1* | 1/2025 | Teranishi | .............. | B60R 16/033 |

\* cited by examiner

VEHICULAR ELECTRICAL SYSTEM SHARING PRIMARY POWER WITH UPFIT EQUIPMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to power distribution systems for motor vehicles, and, more specifically, to power control for supplying an upfit subsystem with auxiliary loads added by a consumer as an upfit.

In view of the wide range of electrical devices and systems (i.e., electrical loads) and the various types of electrical power sources (e.g., generators, batteries, power converters and inverters, ultracapacitors, and fuel cells) used in transportation vehicles, electrical distribution and load management is an important aspect of vehicle operation. Certain electrical loads such as powertrain and braking systems are given priority access to electrical power to maintain vehicle responsiveness to driver control. In order to manage the application of power to various loads, a power distribution circuit may be used which is comprised of an electronic module including switching elements, electrical sensors, and a programmable controller which interfaces with the various electrical power sources and electrical loads in the vehicle.

Electrical power sources in a vehicle may include storage batteries, electrical generators, and electrical converters. Both gasoline-powered vehicles and electric vehicles may include a low voltage DC battery for supplying low voltage accessories, acting as a buffer for current surges, and (in the case of gas vehicles) operating a starter motor for a combustion engine (all of which are referred to herein as a start-up battery). The main electrical power source may include a generator driven by a combustion engine or a DC-DC converter which steps down a high voltage from an electric-vehicle battery pack to a nominal DC voltage for low voltage accessories.

Vehicle upfitting involves accessories or add-ons which customize a vehicle, such as adding a tailgate lift, handicap lift, or auxiliary exterior lighting. Police vehicles and pickup trucks are frequently customized with upfits. Some upfits may include self-contained power supplies, but many will tap into the original electrical system of the vehicle. To support such installations, vehicle manufacturers may provide a special power distribution box as original equipment on a vehicle in order to distribute main electrical power to multiple fuse-protected branch circuits. The upfit distribution box may be fed from a master power distribution module through a built-in relay in the main module so that if upfit operation creates an excessive power draw then the flow of electrical power from a main power bus can be interrupted (thereby protecting the high priority loads of the vehicle).

Some upfit loads in particular (e.g., a snowplow or a motorized winch) may be more likely to create power surges which may cause tripping of the built-in relay, especially if a user has not installed a recommended upfit battery as part of an upfit subsystem. While the built-in relay may isolate a main electrical power source, the start-up battery may continue to supply the upfit subsystem so that it maintains some functionality. Once a relay has been tripped (i.e., opened), modification of the upfit and then manual resetting of the relay may be required before operation can be restored.

The relay built into the power distribution control module may be a solid-state relay. A common solid-state relay circuit uses field effect transistors (FETs). Solid-state relays may typically be capable of supporting continuous current flow up to about 250 amps and brief surge current up to 400 amps. The main power distribution controller monitors the current and opens the solid-state relay if any prescribed limits are reached.

Compared to a mechanical relay, a solid-state relay may have limitations relating to its ability to repeatedly switch while in a loaded condition. Such limitations are partly due to the inherent generation of heat in the solid-state relay. Therefore, it is desirable to limit the number of times and the frequency at which a solid-state relay is switched. In an upfit subsystem, the user may be unable to ascertain the underlying cause when an interruption or degradation of operation results from the tripping of the relay.

SUMMARY OF THE INVENTION

In one aspect of the invention, a vehicle comprises a primary electrical power source and a start-up battery adapted to be recharged by the primary electrical power source. A power distribution circuit defines a main power bus coupled to the primary electrical power source and configured to selectably couple the main power bus to a plurality of priority loads, wherein the power distribution circuit includes a solid-state relay configured to selectably couple the main power bus to the start-up battery. An upfit subsystem is coupled to a junction between the solid-state relay and the start-up battery, wherein the upfit subsystem comprises a relay configured to selectably couple power received from the junction to at least one upfit load. Sensors monitor a first voltage at the junction and a second voltage at the main power bus. The solid-state relay is configured to open when an electrical output from the main power bus to the junction exceeds a tripping threshold. The solid-state relay is further configured to reclose after (A) a first voltage at the junction stabilizes at or above a predetermined voltage, and (B) a second voltage from the primary electrical power source at the main power bus is adjusted to match the first voltage.

DETAILED DESCRIPTION OF PREFERRED EMBODIMENTS

Figure 1:
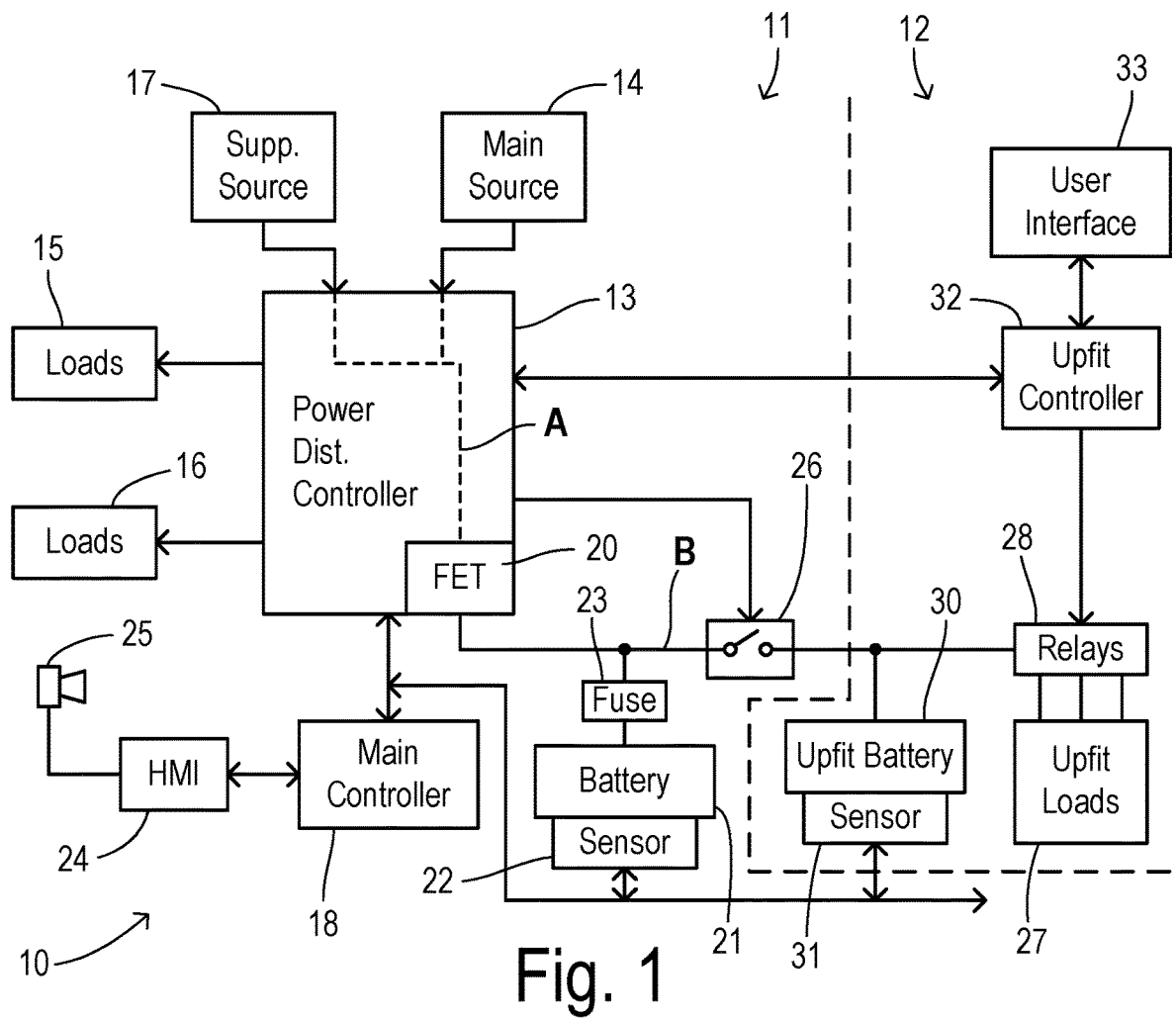
FIG. 1 is a block diagram showing a vehicle electrical system with an upfit subsystem.

Embodiments of the present invention are adapted for electric power distribution in road vehicles (e.g., combustion-engine vehicles and electric-powertrain vehicles) which include an upfit power supply system which can connect vehicle electrical power to upfit subsystems of the types used in vehicle customization, such as in police vehicle accessories, plow trucks, bucket trucks, or pickup trucks with a tailgate lift, a winch, exterior lighting, or other electrical accessory. A main power distribution circuit may include a portion which is configured to deliver power to an engine-compartment mounted fuse box, for example. Because of cost and/or packaging limitations, the upfit portion of the main power distribution controller (PDC) module may be limited to providing current to the upfit subsystem no more than 200 amps continuous (250 amp current surges). Large plows or lifts may draw more current than this, especially if a recommended, dedicated upfit battery has not been installed is the upfit subsystem. Current in excess of the limit will trip a protective relay in the PDC, thereby cutting off the upfit subsystem (as well as the vehicle's storage battery) from the main source of electrical power such as a DC-DC converter which taps power from the high voltage battery pack of an electric vehicle to supply a lower voltage to various vehicle accessories and to recharge the storage battery. The protective relay in the PDC may be a FET relay of a type which is not intended to be opened and closed for an excessive number of times (or at an excessively high repetition rate) when under electrical load.

Various sensors may be used to characterize operation of the electrical system, including having battery management sensors (BMS) associated with the vehicle start-up battery and the upfit battery (if present). The batteries may each be protected by a fuse. When the PDC FET relay has tripped (e.g., due to an electric upfit motor starting), the PDC or another electronic controller measures, stores, and graphs the upfit current and/or voltage trajectory which is then displayed to the user on a touchscreen or other display screen in the vehicle to show the electrical drops and/or spikes being caused by upfit operation. The trajectory display can also be initiated when an upfit load approaches within a predetermined percentage (e.g., 10%) of the maximum continuous running current or the maximum surge current of the FET relay. These displays may also be useful for developers/installers of upfitter equipment to help ensure the upfit operates within the available electrical supply.

When the FET relay is tripped, an audio tone may be generated (using interior speakers or an exterior sound exciter), and a warning message may be displayed on the touchscreen. The warning may also comprise a graph of current flows from either or both of the FET relay and the BMS. Data representing the last several tripping events can be stored for later recall, enabling a user to identify what is going on with their vehicle.

In order to restore main electrical power to the upfit subsystem, the start-up battery voltage is monitored. Once the voltage recovers to a predetermined voltage and is stabilized (indicating that the surge is over) then the voltage from the main source (e.g., the DC-DC converter) is decreased to the level of the stabilized voltage and then the FET relay is reclosed. The predetermined voltage is a voltage level which is sufficient to enable proper operation of the main priority loads of the vehicle. This allows the DC-DC converter to again support the load. Once the FET relay is closed, the output voltage of the main source is dynamically raised until either the maximum current for the FET relay is reached (e.g., 200 amps) or a nominal battery charging voltage is reached. If current flowing from the start-up battery gets close to blowing a battery fuse then a relay between the battery and the upfit subsystem (e.g., a mechanical relay) is opened. In another embodiment, upfit relays in the upfit subsystem can be selectably controlled in a priority order (as established by the user) to prevent tripping the FET relay. In another embodiment, if the FET relay is opened/closed too frequently (x number of times in a time period y) then a warning can be generated and a supplemental reset time could be implemented before a reclosed of the FET relay to slow down the frequency. The same measures can also be applied to the optional upfit battery and/or relay.

Referring to FIG. 1, a block diagram shows a vehicle 10 with an electrical system having a vehicle side 11 and an upfit subsystem side 12. The vehicle side electrical system 11 includes a power distribution controller (PDC) 13 for selectably coupling a main electrical power source 14 to priority vehicle loads 15 and 16, such as electric power assisted steering, antilock braking, and powertrain control devices. Main source 14 may be a generator or alternator which is driven by an internal combustion engine or it may be comprised of a DC-DC converter in an electric propulsion vehicle which includes a high voltage battery pack as a main electrical storage device. The DC-DC converter in such vehicles reduces the high voltage (e.g., 400 volts DC) to a lower voltage (e.g., 14 volts DC) for powering traditional electric accessories and components. PDC 13 may also be connected to one or more supplemental electric power sources 17, such as an ultracapacitor. PDC 13 combines inputs of the electric power sources onto a main power bus A.

PDC 13 may be comprised of an electronic module comprised of an integrated microcontroller or other logic circuits for performing power distribution functions, and/or PDC 13 may be coupled with a main controller 18 for sharing some or all of the computation and control functions.

PDC 13 may control many different circuits or branches, each branch supplying different loads or subsystems. Each branch may have a respective relay built into PDC 13 or controlled by PDC 13 for selectively energizing different branches.

One function of PDC 13 may be to provide current from sources 14 and 17 to a low-voltage start-up battery 21. Battery 21 is configured to supply various low voltage (e.g., 12 volt) accessories and/or to provide power to a starter motor for starting an internal combustion engine. Start-up battery 21 can be recharged through a solid-state FET relay 20 in PDC 13 via a fuse 23. Likewise, FET relay 20 can be closed to supply main power from main power bus A to other low voltage DC loads (not shown) that may be connected to a junction B between FET relay 20 and start-up battery 21.

A sensor 22 monitors battery 21 and provides various parametric data including battery current and battery voltage to PDC 13 and/or main controller 18 over a multiplex bus 19. Main controller 18 is further connected to a human machine interface (HMI) 24 which is further connected to an audio loudspeaker 25. PDC 13 includes additional sensors or monitoring circuitry (and/or may also be in communication with other electrical sensors in vehicle 10) to quantify voltage and current flow at various locations, such as at FET relay 20, main source 14, and main power bus A.

PDC 13 is coupled to a relay 26 (e.g., a discrete mechanical relay) to selectively couple electric power from junction B to upfit subsystem 12. Upfit subsystem 12 may include a plurality of upfit loads 27 via a plurality of upfit relays 28. Upfit loads 27 may be connected in separate branch circuits which are selectably coupled to power from junction B by respective individual relays within relays 28. In some upfit installations, an up fit battery 30 (having a corresponding upfit battery sensor 31) is connected in parallel with battery 21 to provide additional electrical power to the input of upfit relays 28. An upfit controller 32 and a user interface 33 are configured to enable manual control of relays 28 in order to selectively activate upfit loads 27. Upfit controller 32 may be communicatively coupled with PDC 13.

Figure 2:
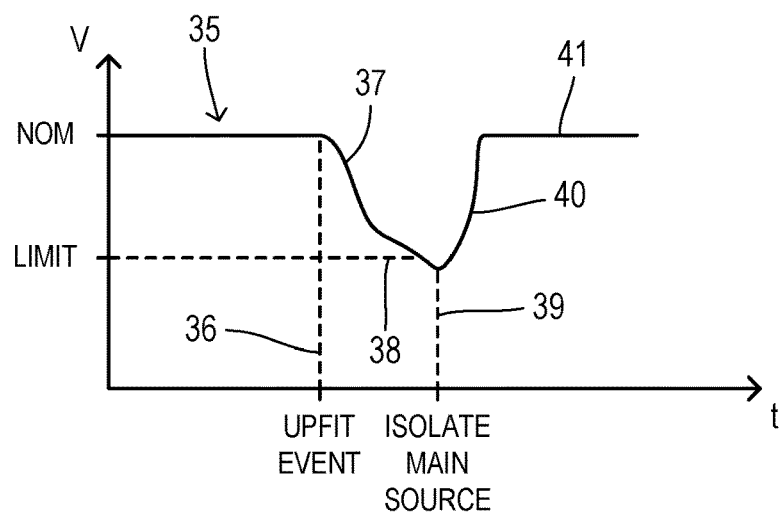
FIG. 2 is a plot showing a voltage on a main power bus during an excessive surge current to the upfit subsystem.

FIG. 2 is a graph showing a voltage plot 35 representing a voltage on the main power bus before and after an activation of upfit equipment which causes a power surge which could impact operation of the higher priority loads in the vehicle. Voltage at the main power bus is maintained at a nominal level (e.g., 14 VDC) until the occurrence of an upfit event at a time 36. The upfit event causes the voltage to decrease along a line 37. When an excessive amount of current is drawn by the upfit subsystem so that the voltage of the main power bus decreases below a prescribed limit 38, then the solid-state relay is tripped (e.g., the FET switch in the relay is caused to opened by the PDC controller). This isolates the main source from the upfit subsystem at a time 39. After being isolated, the voltage at the main power bus is restored to its nominal level a long line 40 and then stays at the nominal level along line 41.

Figure 3:
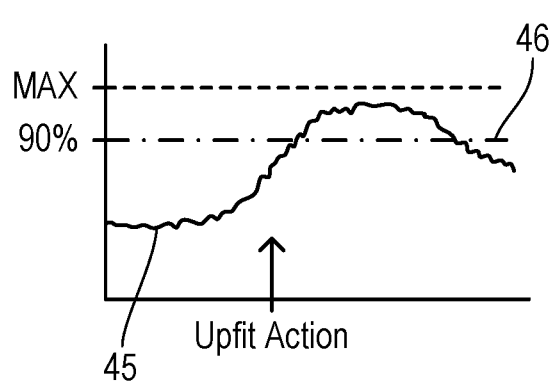
FIG. 3 is a plot showing a current flow to the upfit subsystem during activation of an upfit action.

A warning event and/or a tripping event can also be determined based on current flow to the upfit subsystem. For a warning event, current is monitored to detect instances when the current closely approaches a maximum permissible limit. When this occurs, a warning is generated to a user in order to inform them that a contemporaneous action taken by the upfit subsystem has come close to causing a power interruption. FIG. 3 is a graph showing a current plot 45. The upfit current increases during an upfit action so that current drawn through the FET relay begins to increase. A warning threshold 46 is defined at a percentage of a maximum allowed current (e.g., at a level of 90% of the tripping threshold). When current exceeds warning threshold 46, a warning is triggered such as a textual message on a touchscreen display panel to inform the user of the possibility of an imminent tripping of the relay.

Figure 4:
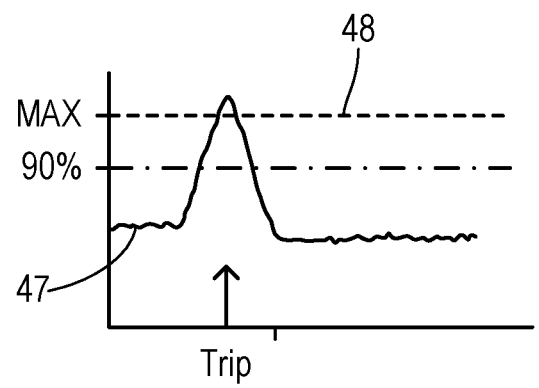
FIG. 4 is a plot showing a current flow during activation of an upfit action that is sufficiently high to trip the solid-state relay.

For a tripping event, FIG. 4 is a graph showing a current plot 47. Current plot 47 spikes in response to an upfit action so that it crosses a tripping threshold 48. In response, the solid-state relay is tripped (i.e., opened) by the PDC controller.

Figure 5:
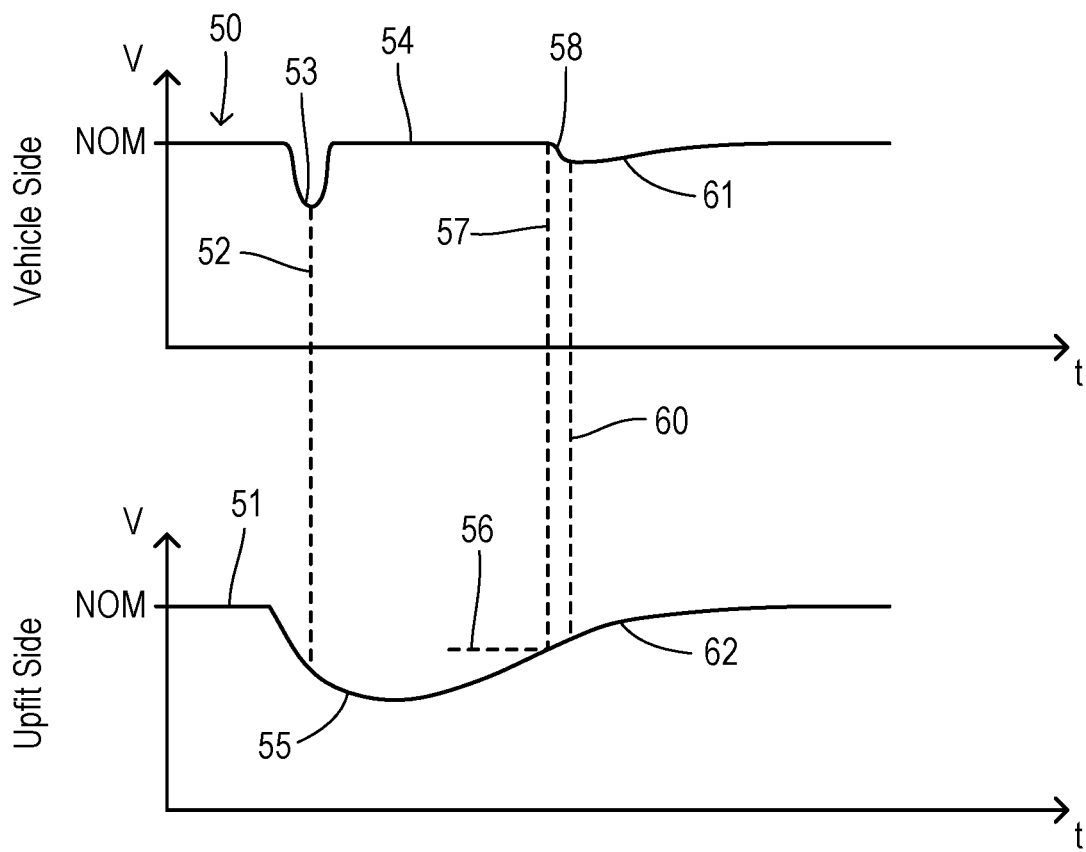
FIG. 5 is a plot showing main power bus voltage and upfit subsystem voltage over a period of time in which the solid-state relay is opened and subsequently reclosed.

After tripping of the solid-state relay, the present invention attempts to reclose the solid-state relay in order to support the desired use of the upfit subsystem once the event that caused the power surge has ended. Furthermore, the re-closing of the solid-state relay is performed in a manner which avoids harmful stress on the solid-state relay. FIG. 5 shows trajectories of a voltage at a vehicle side of the solid-state relay and at an upfit side of the solid-state relay. On the vehicle side, a voltage plot 50 initially shows the main power bus voltage at a nominal level. Similarly, a voltage plot 51 for the upfit side of the solid-state relay begins at its nominal level. After an activation of the upfit subsystem, an excessive current draw extending up to a time 52 has caused a dropping of both voltages. At time 52, the solid-state relay is tripped. The vehicle-side voltage begins to recover from a minimum voltage 53 back up to its nominal voltage at line 54. Voltage on the upfit side of the relay continues to decrease along line 55. Once the particular action of the upfit subsystem ceases (e.g., by manual deactivation), then the upfit-side voltage along line 55 gradually begins to recover and stabilizes. When the stabilizing voltage reaches a predetermined stable level 56 an attempt may be made to re-close the solid-state relay. Stabilized voltage level 56 may, for example, correspond with a minimum desired voltage level for supporting operation of the high priority loads of the PDC. A stable voltage at voltage level 56 on the upfit side enables the voltage at the main power bus to be decreased to match the upfit-side voltage while remaining in a specified operation range of the high priority loads. Thus, the vehicle-side voltage at the main power bus is decreased along a line 58 starting at time 57. For example, a DC-DC converter is commanded to drop the output voltage of the converter in order to match the stabilized voltage level of the upfit subsystem at time 57. The main power bus voltage ramps down along line 58 until it reaches a matching voltage with the junction feeding the upfit subsystem at a time 60. Once the voltage is matched, the solid-state relay can be re-closed without causing any stress or inrush currents in either direction. Once the solid-state relay is reclosed, then the output voltage from the DC-DC converter can be gradually increased along line 61 in order to recover to the nominal voltage. Consequently, the upfit-side voltage likewise increases along the line 62 and is restored to its nominal level.

Figure 6:
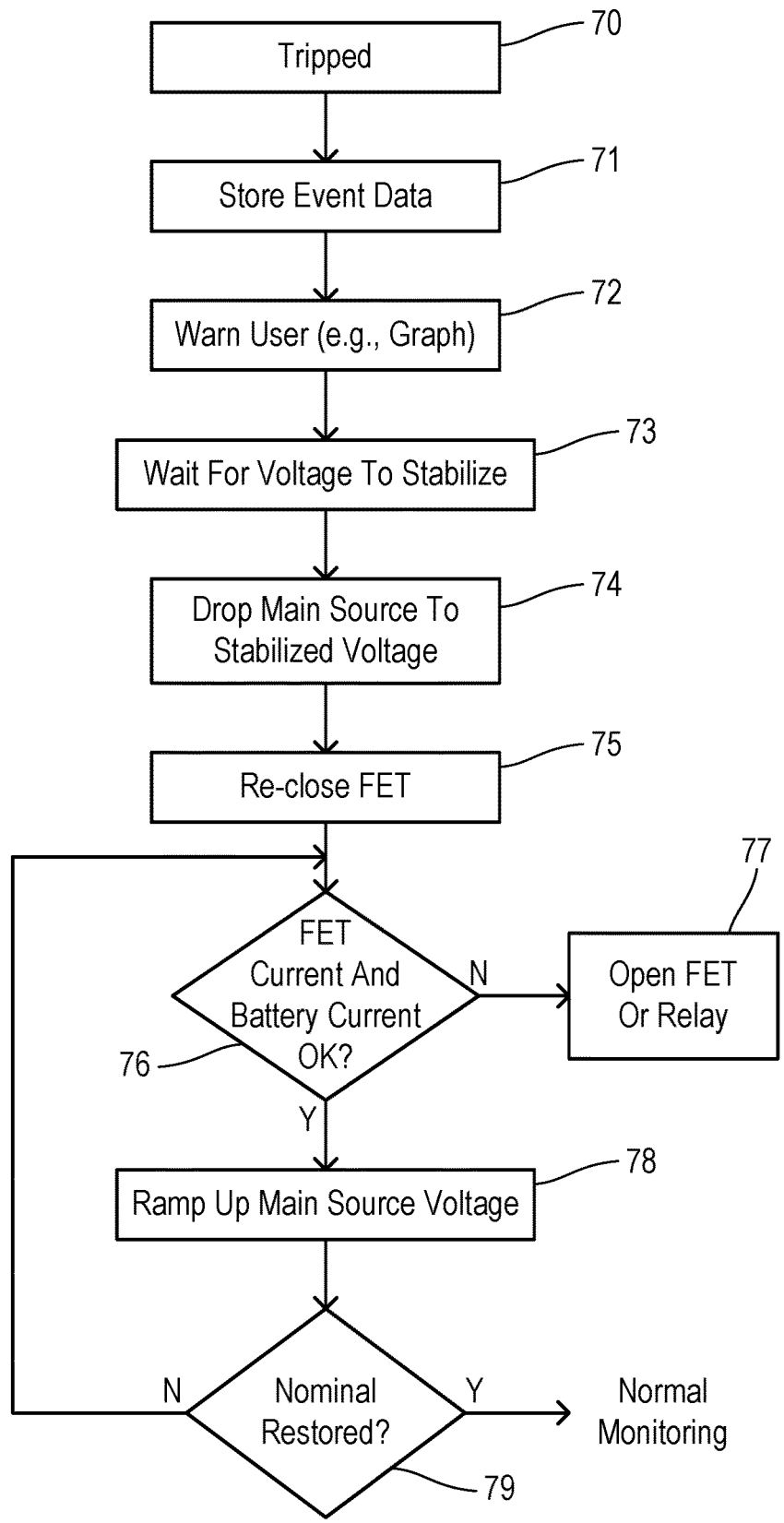
FIG. 6 is a flowchart showing one preferred method of the invention.

FIG. 6 shows a flowchart of one preferred embodiment of the invention. The solid-state relay is tripped in step 70 so that the upfit subsystem has been uncoupled from the main electrical power source. Operation of the upfit subsystem may become degraded since it has to rely only on the startup battery and/or the upfit battery, but operation of the high priority loads is protected since they remain connected to the main primary power source. In step 71, event data is stored. The event data may include a trajectory of voltage or current supplied to the upfit subsystem before and after the tripping event occurred, and a date/time that the solid-state relay is tripped. In step 72, the user is given a warning so that they can be informed that any degradation in operation of the upfit subsystem is a result of its excessive use of main power. The warning may preferably comprise the display of a graph on a touchscreen display. In particular, a series of trajectories for respective tripping events may be displayed (if they are found in the stored data). The warning can alternately be comprised of a warning sound, a warning light, or other perceptible message.

After making the warning, the invention attempts to reclose the solid-state relay by waiting for the upfit-side voltage to stabilize in step 73. To be considered stabilized, the voltage needs to recover at or above a predetermined voltage. Once the voltage is stabilized, then the output voltage from the main electrical power source is decreased in step 74 in preparation for re-closing the solid-state relay. The decrease continues until it matches the level of the stabilized voltage at the upfit side, and then the relay is re-closed in step 75. Once the relay is re-closed, current draw and voltage continue to be continuously monitored to ensure that adequate power continues to be available for the high-priority vehicle electrical loads and to ensure that the start-up battery is protected from excessive depletion. Thus, a check is performed in step 76 to determine whether the current through the solid-state relay and the current through the battery are at acceptable levels. If current flowing from the startup battery to the upfit subsystem is excessive, then the mechanical isolation relay is opened in step 77. Excessive battery current is a level of battery current that approaches a tripping current of the battery fuse. If current flowing through the solid-state relay is excessive, then it is re-opened in step 77. If no excessive currents have begun to flow, then the output voltage from the main power source is caused to ramp up in step 78. A check is performed in step 79 to determine whether the ramping up of the main source voltage has returned it to the nominal level. If not, then a return is made to step 76. Once the nominal main source voltage is reached, then further ramping up is discontinued and normal monitoring is restored.

Figure 7:
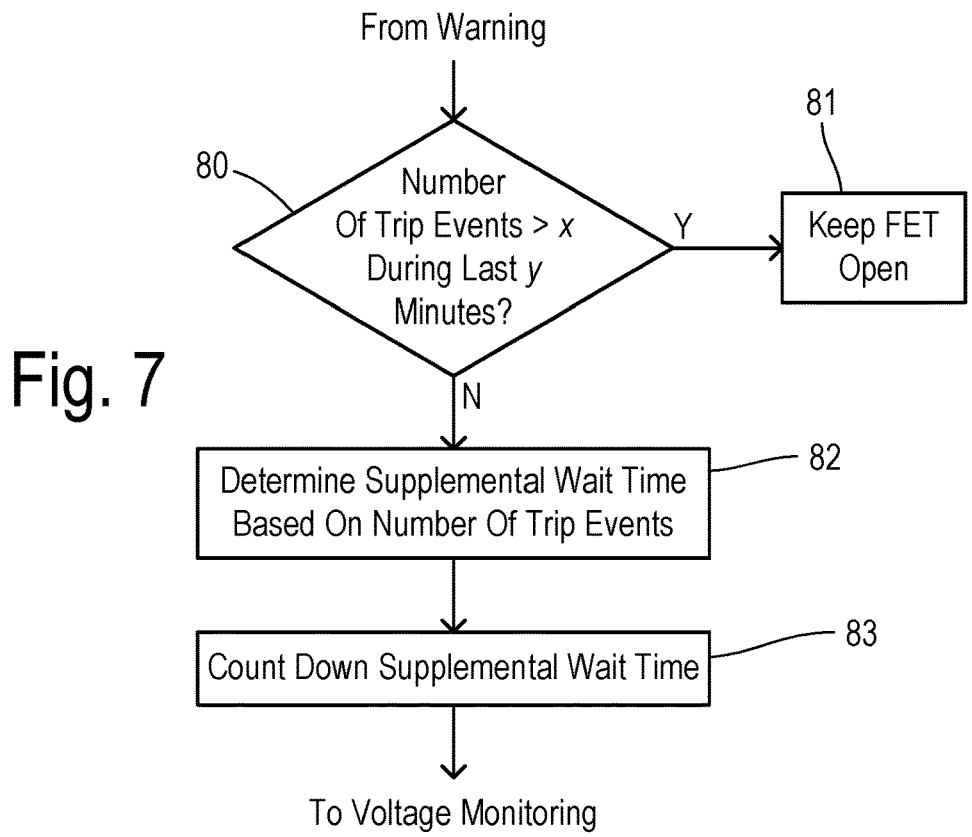
FIG. 7 is a flowchart showing a method in which a supplemental wait time is implemented according to a number of trip events that have occurred.
Figure 8:
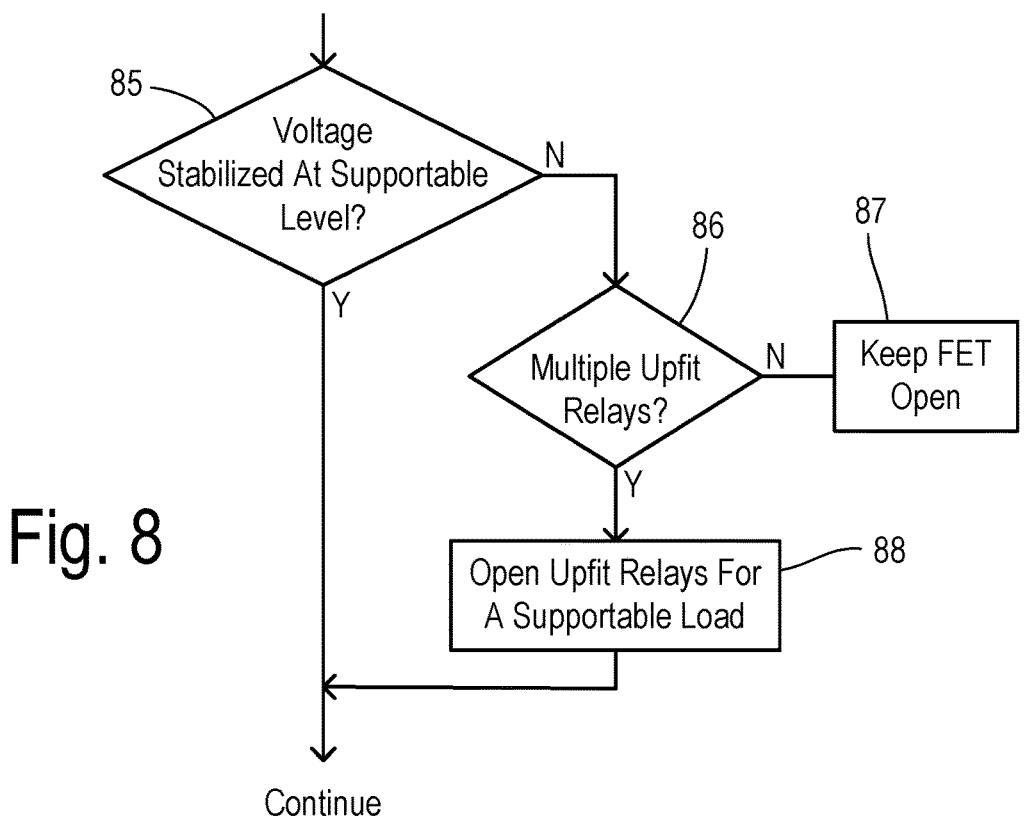
FIG. 8 is a flowchart showing a method in which separate upfit loads are switched on or off according to a prioritization so that the current drawn by the upfit subsystem is supportable.

FIG. 7 shows a further embodiment which may be performed after generating a warning to the user (e.g., between steps 72 and 73 in FIG. 6). The embodiment is based on the number of relay tripping events that occur within a certain period of time. In step 80, the number of trip events that has occurred is compared with a threshold number of events (x) occurring during a recent predetermined period of time (y). If the number of trip events x exceeds the threshold, then the solid-state relay remains open at step 81. If an excessive number of trip events has not occurred, then a further measure may be taken in step 82 wherein a supplemental wait time is implemented based on the number of trip events that did occur. If there are no previous trip events, then there may be no supplemental wait time. When there is some number of trip events less than the threshold, then a gradually increasing supplemental wait time may be identified in step 82. The supplemental wait time may be inserted into the process after the voltage has stabilized. In other words, the wait time is initiated once the voltage is stabilized and delays the time at which the solid-state relay is re-closed. The supplemental wait time is counted down in step 83 and then the solid-state relay may be closed. Thereafter, voltage and current monitoring can proceed while the main source voltage is ramped up.

In another embodiment, additional actions may be taken in the event that the upfit subsystem as a whole continues to draw an excessive current that prevents re-closing of the solid-state relay. In some embodiments, the upfit subsystem may have multiple different loads controlled by different respective upfit relays which can selectively operate some loads at a higher priority than other loads. Thus, a check is performed in step 85 to determine whether the upfit-side voltage is stabilized at a supportable level while the solid-state relay is still in an open state. If it has not, then a check is performed in step 86 to determine whether there are multiple upfit relays. If not, then the solid-state FET relay remains open at step 87. Otherwise, a user-defined priority scheme may be used to open a subset of the upfit relays in step 88 for the low priority loads in order to reduce the current drawn by the upfit subsystem to a supportable level. Then a return can be made to re-close the solid-state relay.

What is claimed is:

1. A vehicle comprising:
a primary electrical power source;
a start-up battery adapted to be recharged by the primary electrical power source;
a power distribution circuit defining a main power bus coupled to the primary electrical power source and configured to selectably couple the main power bus to a plurality of priority loads, wherein the power distribution circuit includes a solid-state relay configured to selectably couple the main power bus to the start-up battery;
an upfit subsystem coupled to a junction between the solid-state relay and the start-up battery, wherein the upfit subsystem includes a relay configured to selectably couple power received from the junction to at least one upfit load;
sensors for monitoring a first voltage at the junction and a second voltage at the main power bus;
a controller coupled to the sensors and configured to control opening and reclosing of the solid-state relay and to adjust the second voltage from the primary electrical power source to match the first voltage and to gradually increase the second voltage to a nominal value;
an isolation relay coupled between the junction and the upfit subsystem; and
a fuse coupled between the start-up battery and the junction configured to interrupt an output from the start-up battery based on the output current from the battery rising to a predetermined limit;
wherein the sensors further monitor the output current of the start-up battery;
wherein after reclosing the solid-state relay the controller is configured to open the isolation relay based on the output current of the start-up battery exceeding a predetermined threshold, wherein the predetermined threshold includes a value of current adapted to prevent the output current from the start-up battery from rising to the predetermined limit;
wherein the solid-state relay is configured to open based on an output current from the main power bus to the junction exceeding a tripping threshold; and
wherein the solid-state relay is configured to reclose after (A) the first voltage at the junction stabilizes at or above a predetermined voltage, and (B) the second voltage from the primary electrical power source at the main power bus is adjusted to match the first voltage.

2. The vehicle of claim 1 wherein the controller is configured to generate a warning within the vehicle based on the solid-state relay being opened.

3. The vehicle of claim 2 wherein the warning includes a graphical display of a trajectory of a current flow to the upfit subsystem.

4. The vehicle of claim 3 wherein the controller is further configured to generate the warning based on the output current from the main power bus to the junction exceeding a warning threshold which represents a predetermined percentage of the tripping threshold.

5. The vehicle of claim 3 wherein the controller is further configured to store a history of the trajectory of current flow for a plurality of tripping events, and wherein the warning includes of displaying a plurality of the trajectories.

6. The vehicle of claim 1, wherein the controller is additionally configured to adjust the second voltage from the primary electrical power source;
wherein the controller is configured to (1) store time-related data for each event based on the solid-state relay opening in response to the output current from the main power bus to the junction exceeded the tripping threshold, and (2) inserting a supplemental wait time before the reclosing of the solid-state relay having a duration according to a number of the stored events during a predetermined prior time interval.

7. The vehicle of claim 6 wherein the controller is further configured to inhibit further reclosing of the solid-state relay based on the number of the stored events during the predetermined prior time interval exceeding a threshold number.

8. The vehicle of claim 1
wherein the controller is configured to control the opening and reclosing of the solid-state relay and to adjust the second voltage from the primary electrical power source;
wherein the upfit subsystem includes a plurality of separately switchable upfit loads; and
wherein the controller is configured to deactivate the switchable upfit loads in a prioritized order to avoid the output current from the main power bus to the junction reaching the tripping threshold.

9. The vehicle of claim 1 wherein the primary electrical power source includes a DC-DC converter.

10. A method of controlling power distribution in a vehicle having a plurality of priority loads and an upfit subsystem, wherein the vehicle includes a primary electrical power source, a start-up battery, and a power distribution circuit, wherein the start-up battery is adapted to be recharged by the primary electrical power source, wherein the power distribution circuit defines a main power bus coupled to the primary electrical power source and configured to selectably couple the main power bus to the plurality of priority loads, wherein the power distribution circuit includes a solid-state relay configured to selectably couple the main power bus to the start-up battery, wherein the upfit subsystem is coupled to a junction between the solid-state relay and the start-up battery, wherein the upfit subsystem comprises includes a relay configured to selectably couple power received from the junction to at least one upfit load, wherein the vehicle further includes an isolation relay coupled between the junction and the upfit subsystem and a fuse coupled between the start-up battery and the junction configured to interrupt an output from the start-up battery based on an output current from the start-up battery rising to a predetermined limit, and wherein the vehicle includes sensors for monitoring a first voltage at the junction and a second voltage at the main power bus, the method comprising:
opening the solid-state relay based on an output current from the main power bus to the junction exceeding a tripping threshold;
monitoring the first voltage at the junction between the solid-state relay and the start-up battery; and
based on the first voltage stabilizing at or above a predetermined voltage (A) adjusting the primary electrical power source to generate the second voltage at the main power bus that matches the first voltage, (B) reclosing the solid-state relay, and (C) gradually increasing the second voltage to a nominal value; and
storing time-related data for each event based on the solid-state relay being opened responsive to the output current from the main power bus to the junction exceeding the tripping threshold; and
inserting a supplemental wait time before the reclosing of the solid-state relay having a duration according to a number of the stored events during a predetermined prior time interval.

11. The method of claim 10 wherein the isolation relay coupled between the junction and the upfit subsystem and the fuse coupled between the start-up battery and the junction configured to interrupt an output from the start-up battery based on an output current from the start-up battery rising to the predetermined limit, wherein the method includes:
monitoring the output current of the start-up battery; and
after reclosing the solid-state relay, opening the isolation relay based on the output current of the start-up battery exceeding a predetermined threshold, wherein the predetermined threshold includes a value of current adapted to prevent the output current from the start-up battery from rising to the predetermined limit.

12. The method of claim 10 further comprising:
generating a warning within the vehicle based on the solid-state relay being opened.

13. The method of claim 12 wherein the warning includes a graphical display of a trajectory of a current flow to the upfit subsystem.

14. The method of claim 13 wherein the warning is further generated based on the output current from the main power bus to the junction exceeding a warning threshold which represents a predetermined percentage of the tripping threshold.

15. The method of claim 13 further comprising:
storing a history of the trajectory of current flow for a plurality of tripping events;
wherein the warning includes displaying a plurality of the trajectories.

16. The method of claim 10 further comprising inhibiting further reclosing of the solid-state relay based on the number of the stored events during the predetermined prior time interval exceeding a threshold number.

17. The method of claim 10 wherein the upfit subsystem includes a plurality of separately switchable upfit loads, and wherein the method further comprises:
deactivating the switchable upfit loads in a prioritized order to avoid the output current from the main power bus to the junction reaching the tripping threshold.

18. The method of claim 10 wherein the primary electrical power source includes a DC-DC converter.

19. A vehicle comprising:
a primary electrical power source;
a start-up battery adapted to be recharged by the primary electrical power source;
a power distribution circuit defining a main power bus coupled to the primary electrical power source and configured to selectably couple the main power bus to a plurality of priority loads, wherein the power distribution circuit includes a solid-state relay configured to selectably couple the main power bus to the start-up battery;
an upfit subsystem coupled to a junction between the solid-state relay and the start-up battery, wherein the upfit subsystem includes a relay configured to selectably couple power received from the junction to at least one upfit load;
sensors for monitoring a first voltage at the junction and a second voltage at the main power bus; and
a controller coupled to the sensors and configured to control opening and reclosing of the solid-state relay and to adjust the second voltage from the primary electrical power source;
wherein the solid-state relay is configured to open based on an output current from the main power bus to the junction exceeding a tripping threshold;
wherein the controller is configured to (1) store time-related data for each event based on the solid-state relay opening in response to the output current from the main power bus to the junction exceeding the tripping threshold, and (2) inserting a supplemental wait time before the reclosing of the solid-state relay having a duration according to a number of the stored events during a predetermined prior time interval; and wherein the solid-state relay is configured to reclose after (A) the first voltage at the junction stabilizes at or above a predetermined voltage, and (B) the second voltage from the primary electrical power source at the main power bus is adjusted to match the first voltage.

20. The vehicle of claim 19 wherein the controller is further configured to inhibit further reclosing of the solid-state relay based on the number of the stored events during the predetermined prior time interval exceeding a threshold number.

* * * * *